(12) United States Patent
Jakobson

(10) Patent No.: US 7,581,004 B2
(45) Date of Patent: Aug. 25, 2009

(54) SYSTEM AND METHOD FOR ALERTING ON OPEN FILE-SHARE SESSIONS ON A USER'S ELECTRONIC DEVICE

(76) Inventor: Gabriel Jakobson, 412 Proud Eagle La., Las Vegas, NV (US) 89144

(*) Notice: Subject to any disclaimer, the term of this patent is extended or adjusted under 35 U.S.C. 154(b) by 522 days.

(21) Appl. No.: 11/354,436

(22) Filed: Feb. 15, 2006

(65) Prior Publication Data
US 2007/0192487 A1    Aug. 16, 2007

(51) Int. Cl.
G06F 15/173 (2006.01)
G06F 15/16 (2006.01)
G06F 7/04 (2006.01)

(52) U.S. Cl. .......................... 709/225; 709/229; 726/26

(58) Field of Classification Search ................ 709/216, 709/224, 225, 229; 726/26
See application file for complete search history.

(56) References Cited

U.S. PATENT DOCUMENTS

| 4,825,354 | A | 4/1989 | Agrawal |
| 5,623,601 | A | 4/1997 | Vu |
| 5,724,578 | A | 3/1998 | Morinaga |
| 5,745,701 | A | 4/1998 | Nguyen Thai |
| 5,764,887 | A | 6/1998 | Kells |
| 6,098,173 | A | 8/2000 | Elgressy |
| 6,393,484 | B1 | 5/2002 | Massarani |
| 6,460,141 | B1 * | 10/2002 | Olden ........................... 726/4 |
| 6,516,351 | B2 | 2/2003 | Borr |
| 6,647,400 | B1 | 11/2003 | Moran |
| 6,850,943 | B2 | 2/2005 | Teixeira |
| 6,938,042 | B2 | 8/2005 | Aboulhosn |
| 7,277,945 | B1 * | 10/2007 | Shah et al. ................... 709/226 |
| 2003/0018725 | A1 * | 1/2003 | Turner et al. ................. 709/206 |
| 2003/0225836 | A1 * | 12/2003 | Lee et al. ..................... 709/205 |
| 2004/0054885 | A1 * | 3/2004 | Bartram et al. ............. 713/152 |
| 2007/0150540 | A1 * | 6/2007 | Kaler et al. ................. 709/205 |

* cited by examiner

Primary Examiner—Larry D Donaghue
Assistant Examiner—Brian J Gillis

(57) ABSTRACT

A method and system for detecting active file-share sessions on a client device, alerting the user of the client device, and enabling the user to terminate the file-share sessions, are disclosed. In accordance with the disclosed method and system, when a remote device (e.g., on a network, the Internet, wireless, etc) connects to a shared file or folder on a client device (e.g., a personal computer, a personal digital assistant, a cellular telephone, personal video recorder, and the like) the user of the client device receives an alert identifying the file-sharing session established through this connection. The user is then presented with an option of whether to approve this file-sharing session, or to disconnect it (thus causing the remote user to lose access to the client device's file system) with a single click of a button.

21 Claims, 3 Drawing Sheets

ID OF INVENTION

SYSTEM AND METHOD FOR ALERTING ON OPEN FILE-SHARE SESSIONS ON A USER'S ELECTRONIC DEVICE

FIELD OF INVENTION

The present invention generally relates to the sharing of files and folders among devices on a network; and, more particularly, to providing a device user with an alert indicating a file or folder on their device is being accessed by a remote device as part of a file-sharing session, and allowing the user to terminate that file-sharing session with a single click.

BACKGROUND OF THE INVENTION

With virtually all computers today connected to some sort of network—home, work or internet—the need to protect one's information contained in one's computer file system, is stronger than ever. The mere act of turning on a laptop in more and more public places (soon entire US metropolitan areas, such as the city San Francisco, which contain city-wide hotspots) joins that laptop to a network with thousands of other users. A network is designed to be a collaborative environment, so the capability of making one's files accessible to others, is included in most operating systems. When an operating system, such as Windows XP®, is Installed, it automatically creates "shares". Shares are folders on the device itself which can be accessed over a network. Some standard shares are designated "C$" and "Admin$"—which are theoretically opened for a network administrator in a corporate environment, through which the administrator can access the individual device to install files and backup information. In addition to these out-of-the-box shares, many users create their own shares to share files and work, both in work and home environments. Additionally, applications—both rogue and legitimate—can create shares on a client device with or without the knowledge of the user. A file share has user rights associated with it. In order to access a share, proper user credentials need to be presented. However, in many cases "guest accounts" are allowed to access shares, in which case the passwords are either "weak" (i.e. easy to guess as in 123) or are blank. One way for User A to access User B's file system, is via UNC (Universal Naming Convention), whereby the target computer's name (NetBIOS or network name) or IP address (Internet Protocol, a 32-bit number, normally expressed as four "octets" in a "dotted decimal number" as in "192.168.1.10") is entered followed by the name of the shared folder. For example, User A's typing "\\UserB's_work_XP\C$" or "\\192.168.1.10\c$", on device A, may grant User A access to Device B's file system. Once access to a shared folder or files is granted, a device is being accessed remotely and the user's private files may be read and copied. File sharing may be transparent to a user of a device whose files are shared. File sharing can be created and instantiated by rogue applications without the knowledge of the user. A user's device may simultaneously be on more than one network or be on a network bridged to other networks, unbeknownst to the user, potentially providing access to the user's device to many computers on those networks.

DESCRIPTION OF THE DRAWINGS

For a more complete understanding of the present invention and further advantages thereof, references are now made to the following Detailed Description, taken in conjunction with the drawings, in which.

SUMMARY OF THE INVENTION

A method and system for detecting an active file-share session on a client device, alerting the user of the client device, and enabling them to terminate the file-share session, are disclosed. In accordance with the disclosed method and system, when a remote computer (e.g., on a network, the internet, etc) connects to a shared file or folder on a client device (e.g., a personal computer, a personal digital assistant, a cellular telephone, a personal video recorder, and the like) the user of the client device receives an alert identifying the file-sharing session established through this connection. The user is then presented with an option of whether to approve this file-sharing session, or to terminate it (thus causing the remote user to lose access to the client device's file system) with a single click of a button.

DETAILED DESCRIPTION

The present invention is described in the context of a specific embodiment. This is done to facilitate the understanding of the features and principles of the present invention and the present invention is not limited to this embodiment. In particular, the example embodiment is described in the context of a client side application which detects open share-sessions and provides a user with the ability to approve or terminate the detected open share-session.

Figure 1:
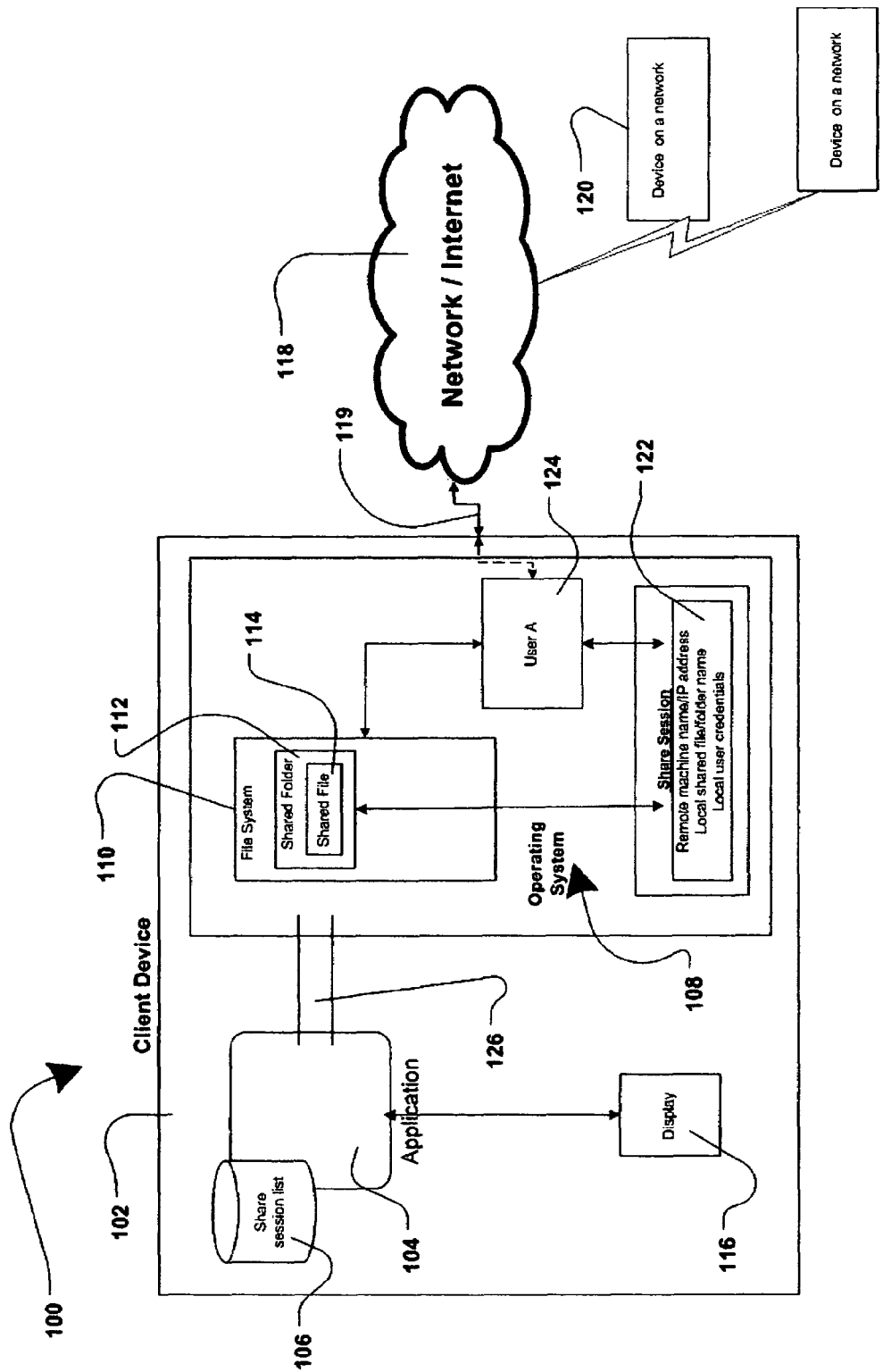
FIG. 1 is a block diagram of the general system architecture allowing for file-sharing alerts, according to one possible embodiment.

FIG. 1 illustrates a block diagram of the general system architecture of one embodiment of a file-sharing alert system 100. The system 100 includes a client-side application program 104 that is installed and executed on a client device 102 which is connected to one or more networks 118 through which other devices 120 may request to share files 114 and folders 112 on said client device 102. The connection 119 to the one or more networks 118 may be through wireless connection, for example WiFi, or through wired connection such as dial-up, DSL, or other forms of broadband connection. The network 118 may be the Internet, a wide area network (WAN) or a local area network (LAN), or any other form of communications network.

In the embodiment illustrated herein, client device 102 includes an operating system 108 which interacts with a file system 110 which may include one or more shared folders 112. Shared folders 112 may include one or more shared files 114. The client device 114, as well as the other device 120, may be a personal computer, mobile telephone or other communications device, a PDA, server computer, a personal video recorder, or other electronic device. Files 114 and folders 112 are accessible to local user account 124. Client side application 104 obtains a list of files 114 and folders 112 which are being opened by another computer 120 on network 118 as part of a sharing session 122, and may display the names of files 114 and folders 112 and the name of device 120 which is accessing them, on a display device 116 of client device 102. While the presently preferred embodiment uses a client side application 104 to monitor access to files and folders by other devices 120, alert suspicious access, terminate access as well as list approved access, alternate embodiments may have the operating system perform such activity and the activity of the different embodiments. Alternatively, the client side application 104 may be a stand alone program for detecting, alerting and/or terminating access to files and folders, or the client side application may be part of a program which also includes functionality such as anti-virus protection, spyware detection and removal, a firewall, or other functionality.

In the presently preferred embodiment, the information obtained by application 104 from operation system 108, for example via standard API (application programming interface) calls, may include values 122, such as: name and IP address of remote device 120 owning the current share session, name of file(s) 114 and/or folders(s) 112 being shared in the current share session, and/or the user credentials 124 under which the current session is opened. In one possible embodiment a user viewing on display 116 of client device 102 a list of files 114 and folders 112 which are being opened by remote device 120, may choose an option to terminate the sharing session, thereby disabling device 120 from further opening shared files 114 and folders 112. Upon a user on client device 102 issuing such command, client-side application 104 instructs operating system 108 to terminate the sharing session 122 which is allowing device 120 to view and/or manipulate files 114 and folders 112. Information pertaining to the specifics of a sharing session and the user's decision as to whether to allow or terminate said session, are written by client-sided application 104 to share session list 106. In future iterations, when client-sided application 104 is informed by operating system 108 of a sharing session by device 120 accessing files 114 and folders 112 on client device 102, client-sided application 104 can refer to share session list 106 to make a determination as to whether a user on client device 102 had already been informed of this particular session, and act in accordance with the desires and instructions of said user. For example, if user on device 102 had been alerted and informed through display 116 that device 120 has opened a sharing session with files 114 in folders 112, and said user had determined said sharing session should be allowed to continue and said determination has been indicated in share session list 106, in future detections of said sharing session, client-sided application 104 may not alert the user again of said sharing-session.

In an alternative embodiment, a system timer 126 may be used to invoke the querying of operating system 108 by client side application 104. The higher the frequency of timer 126 is, the more responsive the system becomes and the more "real time" the alert 116 feels. In one alternative embodiment the frequency for timer 126 is under 1 cycle per second.

In the presently preferred embodiment, the share session list is stored on the client device, either within the memory of the client device or within a storage device. Alternate embodiments may have the share session list, or a portion of the share session list, stored remotely from the client device and accessible through a communications network.

Figure 2:
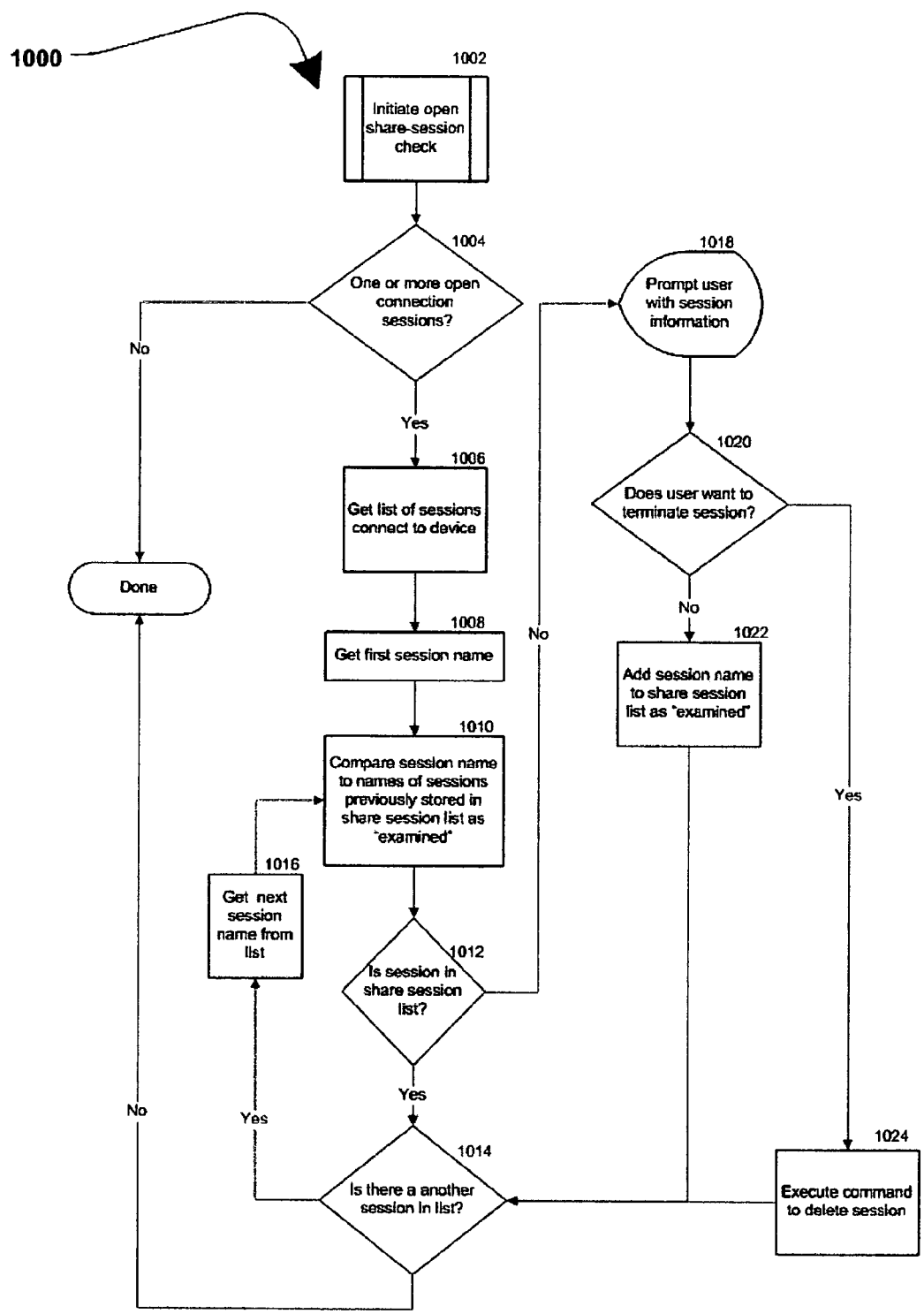
FIG. 2 is a generalized flowchart illustrating the process of checking and approving open share-sessions, according to one possible embodiment.

FIG. 2 illustrates a generalized flowchart which illustrates process 1000 of checking for open share sessions followed by the client-side application 104. In one presently preferred embodiment, process 1000 is driven by step 1002 which queries the operating system to make a determination as to whether one or more open share-sessions 1004 are present. Such query could be initiated by the use of a system timer or alternatively, an interface to the operating system may initiate step 1002 upon the presence of share-sessions 1004. If one or more share-sessions are present, step 1006 generates a list of all such open share-sessions. Alternative embodiments of the present invention may use event driven initiation of queries, or other ways of initiating at step 1002.

Step 1008 extracts the name of the first open share-session from list generated in step 1006. Step 1010 compares the name of the session extracted in step 1008 with names of all sessions previously identified and now stored in an approved share-session list. If the current open share-session is determined to be in the approved share-session list at step 1012, process 1000 proceeds to step 1014 to determine whether there is another session to be examined in list of open share-sessions obtained in step 1006. If step 1014 determines there is another session to be examined, step 1016 obtains the next open share-session's name and step 1010 is repeated for the open share-session name obtained in step 1016.

In the event step 1012 determines a given open share-session's name is not in the share session list, process 1000 proceeds to step 1018. At step 1018 the client side application alerts the user to the existence of an open share-session not included on the approved share-session list. In the presently preferred embodiment, the alert includes information identifying the open share-session determined in step 1012. Such an alert may include the name of the remote device owning the share-session, as well as the specific files and/or folders on the local device which are being accessed via this share-session and the name of the user on the local device under whose credentials the share-session is conducted. As part of alert from step 1018, the user may be presented with an option as to whether to approve or terminate the current share-session. If the user chooses to approve this share-session in step 1020, the name of this share-session is added to the approved share-session list for future reference in step 1022. If the user chooses to terminate this share-session in step 1020, in the presently preferred embodiment step 1024 issues a command to the operating system of the client device to delete the current share-session. In the presently preferred embodiment, step 1014 is repeated until all open share-sessions obtained in step 1006 (and contained in the list of open share sessions) have been compared to the approved share session list. Once all open share-sessions obtained in step 1006 have been compared, process 1000 terminates until initiated again at step 1002.

Process 1000 may also include logging the alerts presented, the action taken in response to an alert, and the information identifying the open share-session, the files and/or folders accessed in the open share-session, information identifying the remote device (including the name and IP address of the remote device) as well as the user privileges associated with the open share-session.

In another embodiment of the present invention, further steps may be taken by the present invention to secure the client device. Once suspicious activity is detected and step 1024 is executed to terminate a session, further actions are performed: file-sharing is suspended and all open sessions are dropped (in one preferred embodiment, step 1024 is executed for each session identified in step 1006, without a user prompt.) Further, reports and alerts may be generated and shared with other users, such as remote administrators, who could take other remedial action.

Figure 3:
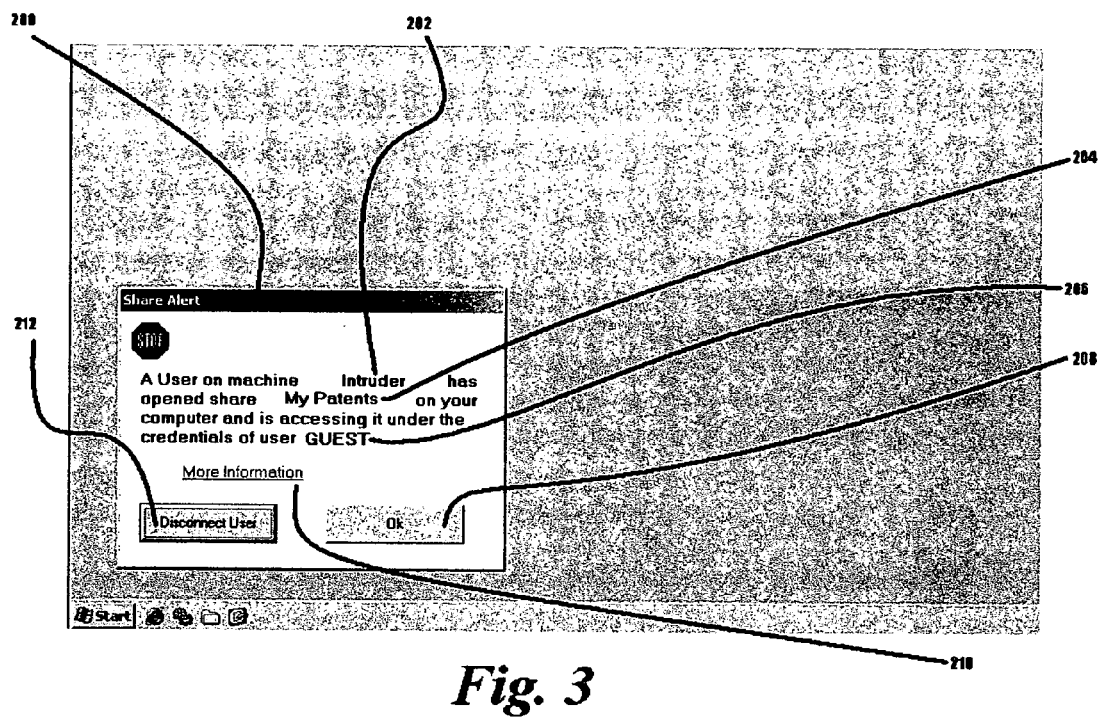
FIG. 3 is a generalized block diagram illustrating an alert window indicating the existence of an open share-session, according to one possible embodiment.

FIG. 3 shows the screen display of a client device with an alert window 200 indicating to the user the existence of an open share-session on their client device. In the presently preferred embodiment, alert 200 includes the name of the remote device 202 owning the current open share-session, as well as the name of the folder 204 being accessed and the name of the user 206 on the local client device, whose credentials are being used to facilitate this open share-session. Additional information may be made available to the user by clicking on link 210. In other possible embodiments of the current invention, additional information may be presented to the user via any other audio or visual means, as available on the client device. Alert window 200 may also include a share-session termination button 212 to terminate the current open share-session and/or a share-session approval button 208 to "okay" the current open share-session. In the presently preferred embodiment, share-session termination button 212 sends an instruction to the operating system to terminate the current open share-session alluded to by alert window 200. (The functionality to terminate/delete/drop/close an open share-session is typically built into operating systems and may result in an error occurring on the remote device owning this connection, indicating to the user on that remote device, that the folders and/or files this connection has given the remote device access to, have become inaccessible.) Share-session approval button 208 indicates the user of the client device has consented to the present open share-session, and in the presently preferred embodiment, indicates that alert window 200 should no longer be displayed in the future to alert to the presence of this specific open share-session. Such functionality is accomplished by adding the name of this specific open share-session to the client device's shared-session list maintained by the client-sided application. In that manner, the next time the client-sided application would detect the presence of the specific open share-session-previously approved by the user and recorded in the shared session list—alert window 200 will not be displayed.

While the example alert illustrated in FIG. 3 specifies only one open share-session, alternate embodiments may alert to multiple open share-sessions, and may present the user with information identifying the remote device or devices associated with the open share-sessions, identifying information for such remote device or devices, the user privileges associated with the open share-sessions in the alert, and information identifying files or folders associated with the open share-sessions in the alert.

The invention has been described with reference to particular embodiments. However, it will be readily apparent to those skilled in the art that it is possible to embody the invention in specific forms other than those of the preferred embodiments described above. This may be done without departing from the spirit of the invention.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of protecting an electronic device against unauthorized access to files and folders associated with said electronic device, comprising:
   determining whether there are active file-share sessions associated with said electronic device;
   in the event at least one active file-share session is determined to exist, determining whether the at least one active file-share session is included on an approved share-session list;
   in the event the at least one active file-share session is determined not to be on the approved share-session list, retrieving identifying information of a remote device associated with the at least one active file-share session; and
   sending an alert, wherein the alert includes the identifying information of the remote device and an approval request providing a recipient of the alert a capability to approve or terminate the at least one active file-share session;
   in response to receiving an approval from said recipient, including on the approved share-session list the at least one active file share session; and
   in response to receiving a denial from said recipient, terminating the at least one active file-share session.

2. The method of claim 1, wherein said remote device identifying information includes a name and an internet protocol ("IP") address of said remote device.

3. The method of claim 1, wherein the alert includes identifying information specifying any files or folders associated with the at least one active file-share session determined not to be on the approved share-session list.

4. The method of claim 1, wherein the alert includes information specifying user credentials under which the any files or folders associated with the at least one active file-share session are determined not to be on the approved share-session list are accessed.

5. The method of claim 1, further comprising:
   in the event at least one active file-share session is determined to exist, suspending access to the at least one active file-share session;
   in response to receiving an approval from said recipient, reinstating access to the at least one active file-share session.

6. The method of claim 1, further comprising:
   recording a log of the determination and the alert presented, the log including the received denial or approval associated with the alert.

7. The method of claim 1, further comprising:
   initiating the determination of whether there are active file-share sessions on said electronic device.

8. The method of claim 7 wherein the initiating step is initiated by a timer.

9. The method of claim 8, wherein the timer is operated at a frequency of greater than 1 cycle per second.

10. The method of claim 7, wherein the initiating step is invoked by an operating system on said electronic device.

11. The method of claim 10, wherein the initiating step is invoked upon detection of access to a file or folder associated with said electronic device.

12. The method of claim 1, wherein the electronic device is a personal computer.

13. The method of claim 1, wherein the electronic device is a mobile telephone.

14. The method of claim 1, wherein the electronic device is a digital video recorder.

15. The method of claim 1, wherein the electronic device is a gaming system.

16. A method of controlling access to data files associated with an electronic device, comprising:
   determining whether a remote device is attempting to create a file-share session associated with the electronic device;
   in the event of a determination that said remote device is attempting to create a file-share session, collecting identifying information of said remote device; and
   sending an alert wherein the alert contains the identifying information and an approval request, wherein the approval request provides a recipient of the alert a capability to approve or reject the attempt to create the file-share session; and
   receiving input from the recipient;
   in the event the input is an approval, allowing said remote device to create a file-share session; and in the event the input is a denial, terminating the attempt to create a file-share session.

17. The method of claim 16, further comprising:

in the event the input is an approval, entering the collected identifying information of said remote device in an approved open share-session list, and prior to sending an alert, determining whether the file-share session is associated with a remote device specified in the approved share-session list;

in the event the file-share session is associated with a remote device specified in the approved share-session list, allowing said remote device to access the file-share session.

18. The method of claim 16, wherein the alert is sent to a user of the electronic device.

19. The method of claim 16, wherein a user is connected to the electronic device over a network.

20. The method of claim 16, further comprising:

determining at least one file affected by the file-share session; and including a name of the at least one file in the alert.

21. The method of claim 16, further comprising:

determining at least one file-folder affected by the file-share session; and including a name of the at least one file-folder in the alert.

* * * * *